Fig. 1.

Patented Apr. 24, 1945

2,374,469

UNITED STATES PATENT OFFICE 2,374,469

PNEUMATIC CONTROL MEANS FOR PHOTO-COMPOSING MACHINES

Stephen N. Wekeman, Saddle River Township, Bergen County, N. J., assignor to General Printing Ink Corporation, New York. N. Y., a corporation of Delaware Application December 24, 1942, Serial No. 469,984

12 Claims. (Cl. 95—76)

My invention relates to photo-composing machines.

My invention has particular reference to a photo-composing machine having a support, either for the printing plate or the light-sensitive surface, which is moved to or from the printing position by the application of pneumatic force.

My invention has further reference to a photo-composing machine comprising a printing plate support and a backboard which carries the light-sensitive surface, the backboard being movable toward and from the printing plate by pneumatic force and, more specifically, the backboard being moved toward and from said printing plate in response to creation of vacuum and pressure effects, respectively.

Various other features, advantages and characteristics of my invention will become apparent from the following detailed description.

My invention resides in the pneumatic control means for photo-composing machines, the novel means for moving a photo-composing machine backboard toward and from a printing plate, features and combinations of the character hereinafter described and claimed.

For an understanding of my invention and for an illustration of one of the many forms thereof, reference is to be had to the accompanying drawings, in which.

Figure 1:
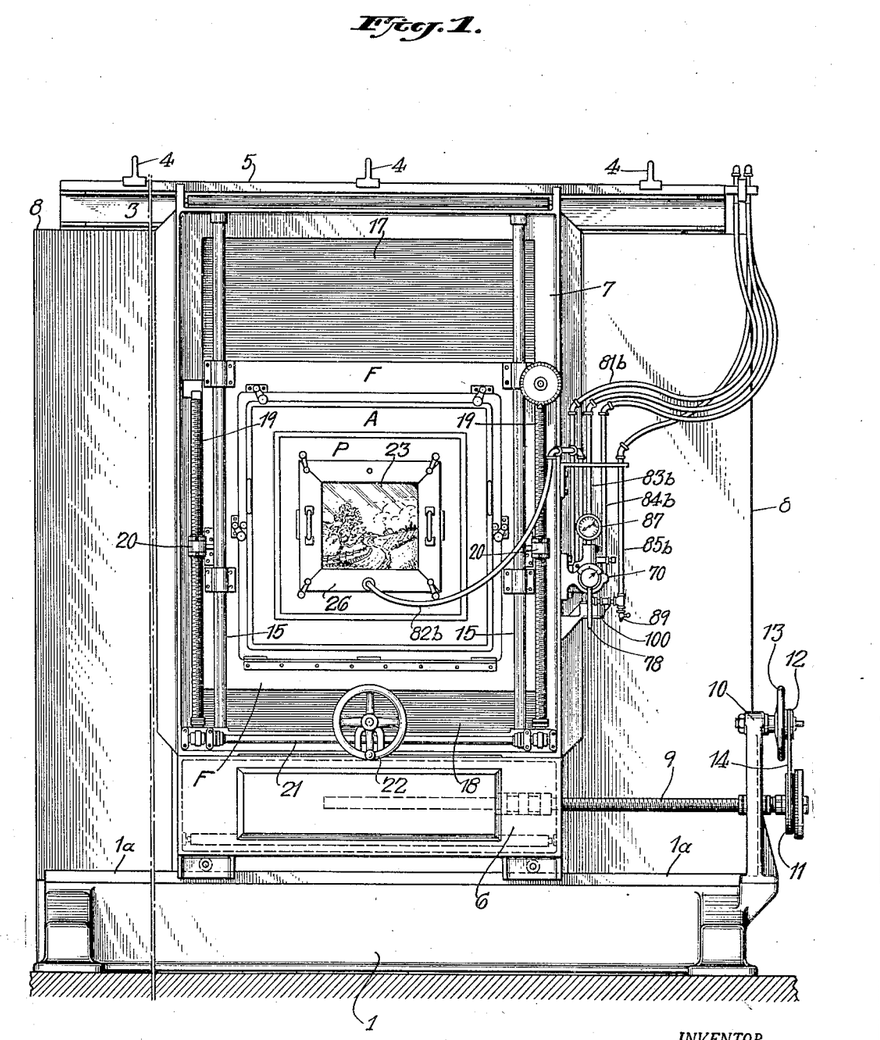
Figure 1 is a front elevational view showing a photo-composing machine as constructed in accordance with my invention.
Figure 2:
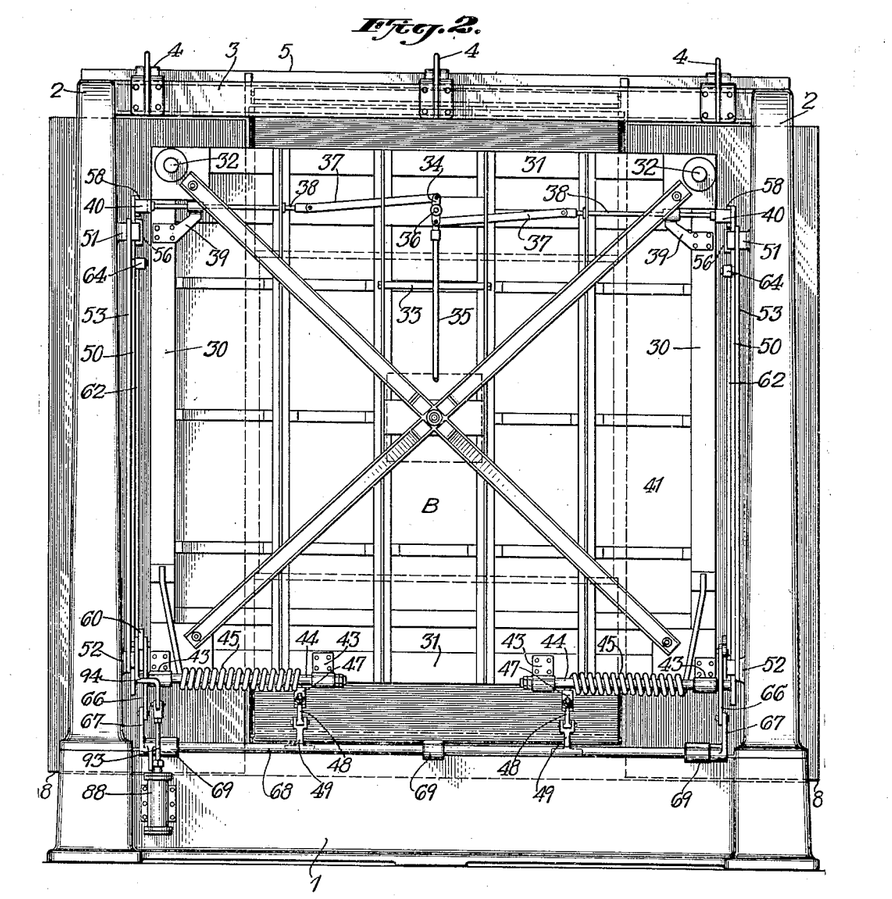
Fig. 2 is a rear elevational view of the photo-composing machine shown in Fig. 1.

Referring particularly to Figs. 1 and 2, there is shown a base 1 which is adapted to occupy a fixed position on a floor or other suitable supporting surface, the base 1 comprising an upper track surface 1a. As shown in Fig. 2, the base 1 carries a pair of vertical standards 2 to which, in suitable manner, is fixed a horizontal member 3 having a plurality of spaced brackets 4 secured thereto and extending transversely therefrom in a horizontal direction. The brackets 4 support a horizontal track member 5 which is disposed vertically above the track surface 1a of the base 1.

Slidably disposed on said track surface 1a is the lower frame section 6 of an open frame section 7, the upper surface of which, in suitable manner, is slidably related to the aforesaid track member 5. Secured in suitable manner to the opposite respective sides of the frame 7 are panels or wings 8 formed from any suitable material as well understood in the art.

The structure comprising the frame sections 6, 7 and the panels 8 are adapted to have translatory movement imparted thereto in either direction horizontally with respect to the track surface 1a and the track member 5. To this end, there may be utilized a horizontal screw 9 which is threaded to one or more nut members carried by the lower frame section 6, said screw member 9 being journaled for rotative movement only in a bracket 10 secured to and upstanding from the base 1. The screw member 9, at its end toward the right, Fig. 1, has secured thereto a pulley 11 which is disposed in the same vertical plane with a pulley 12 secured to a hand wheel 13 journaled for rotatable movement on a stud projecting horizontally from the bracket 10, the pulleys 11 and 12 carrying an endless belt 14. Accordingly, as will be understood, rotary movement, in either direction, imparted to the hand wheel 13 is transmitted to the screw member 9 to thereby effect horizontal movement, in either direction, of the frame sections 6 and 7.

Figure 3:
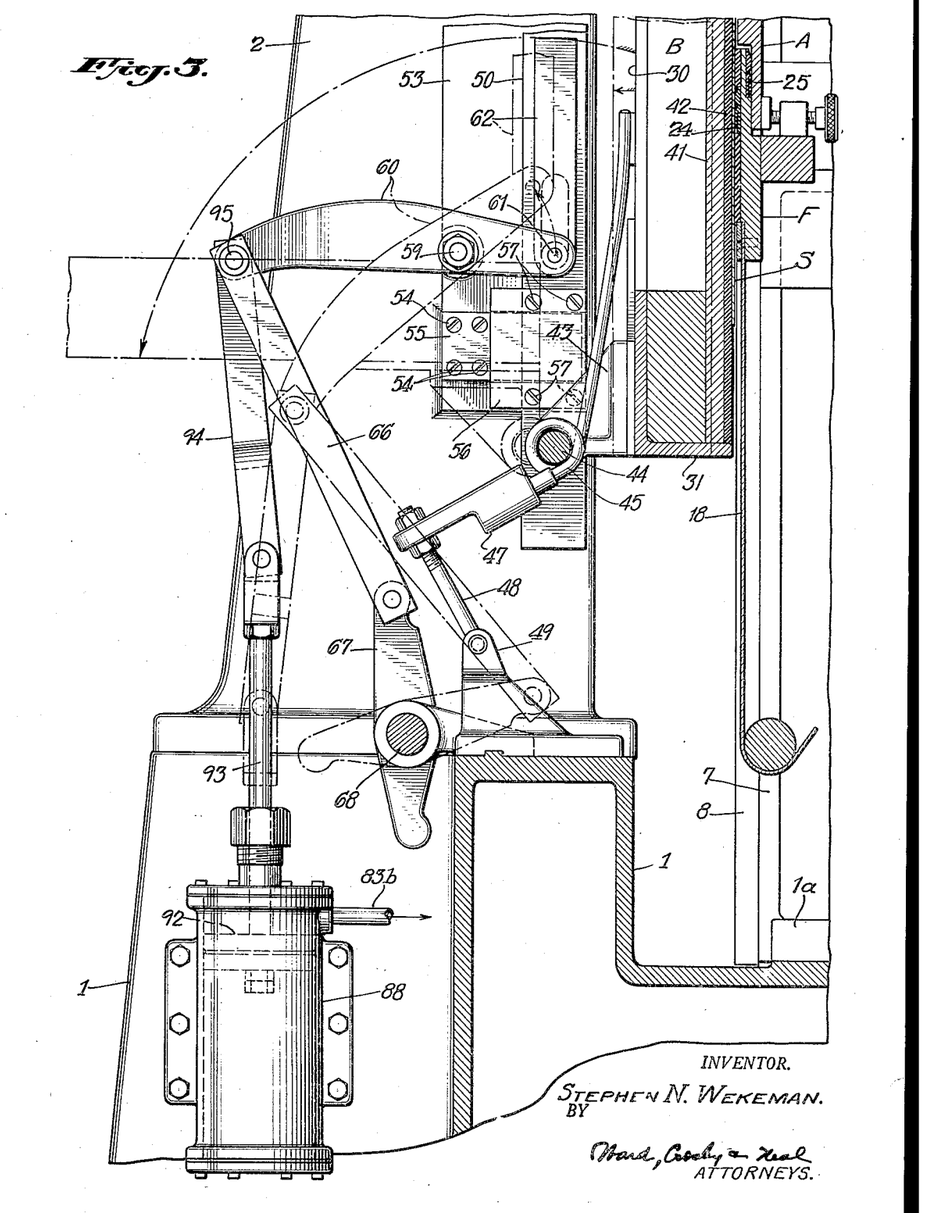
Fig. 3 is an enlarged, vertical sectional view, partly in elevation, showing my novel pneumatic control means associated with the photo-composing machine backboard.

The open frame 7, at the respective opposite sides thereof, carries the vertical track members 15 on which a supporting frame F is slidably disposed, the frame F defining a rectangular opening as understood in the art. As shown in Figs. 1 and 3, upper and lower curtains 17 and 18 are connected to the respective upper and lower sides of the supporting frame F, these curtains being wound upon upper and lower rollers which are suitably supported as known in the art.

The open frame 7, at the respective opposite sides thereof, also carries the vertical jack screws 19 which are journaled in suitable maner. Associated with each jack screw 19 is a nut member 20, these nut members being disposed in horizontal alinement and suitably secured to the open frame 7. A lower horizontal shaft 21, which in suitable manner is journaled and rotated by a hand wheel 22, is geared, at the respective opposite ends thereof, to the jack screws 19. Accordingly, as will be understood, rotatable movement imparted to the shaft 21 by the hand wheel 22 is transmitted to the jack screws 19 to simultaneously rotate the same whereby the supporting frame F is moved either upwardly or downwardly as desired, such movement being accompanied by corresponding movement of the curtains 17 and 18.

The photo-composing machine arrangement described above relates to a type of photo-composing machine heretofore manufactured by Rutherford Machinery Company. My invention, as hereinafter described, is well adapted to this type of photo-composing machines. However, it shall be understood that the invention is not to be thus limited because the novel features of my invention are equally applicable to other photo-composing machines of widely different types.

The frame F, or equivalent, serves as the movable support for a suitable printing plate. Merely for purposes of explanation and without limitation of my invention, I have shown an arrangement similar to that described in U. S. Letters Patent No. 2,174,726 for supporting a printing plate on the frame F.

Thus, as indicated in Figs. 1 and 3, the supporting frame F carries an adapter frame A, the use of which is optional, and the latter, in turn, carries a printing plate holder P which, in turn, carries a printing plate 23. The supporting frame F, on its rear surface, carries an endless sealing strip 24, Fig. 3, formed from soft rubber and having four sides corresponding with and defining a larger area than the opening defined by said supporting frame F. The supporting frame F, on its front surface, carries a similar sealing strip 25 which forms a seal between said supporting frame F and the adapter frame A. The latter carries a sealing strip, not shown, similar to those referred to above so that a seal is formed between said adapter frame A and the printing plate holder P. Associated with the printing plate holder P and the printing plate 23 is a sealing frame 26 which comprises endless sealing strips, Figs. 9 and 13, coactable with said printing plate holder P and said printing plate 23, respectively, to seal the space between them.

Forming a part of the photo-composing machine herein disclosed is a pivoted backboard B utilized for the reception of a press plate or other sensitized member. As herein illustrated, although not necessarily, the backboard B is of the character disclosed in the aforesaid Letters Patent No. 2,174,726. Thus, as shown, the backboard B is a rectangular frame formed from vertical side members 30 together with horizontal top and bottom members 31, said frame being braced in any suitable manner, as by the vertical, horizontal and diagonal members illustrated in Fig. 2. As illustrated, the upper or non-pivoted end of the backboard B, at each corner thereof, carries a supporting leg 32 which rests upon the floor or other supporting surface when said backboard is in horizontal position. Further, the rear surface of the backboard B preferably carries a handle member 33 utilizable for lowering and raising said backboard. Still further, said rear surface of the backboard B carries a lever 34 having an actuating handle 35, said lever 34 being pivoted at 36. Pivoted at opposite ends of the lever 34 are the respective links 37, each of which terminates in a rod 38 guided for horizontal movement by a bracket 39.

Figure 4:
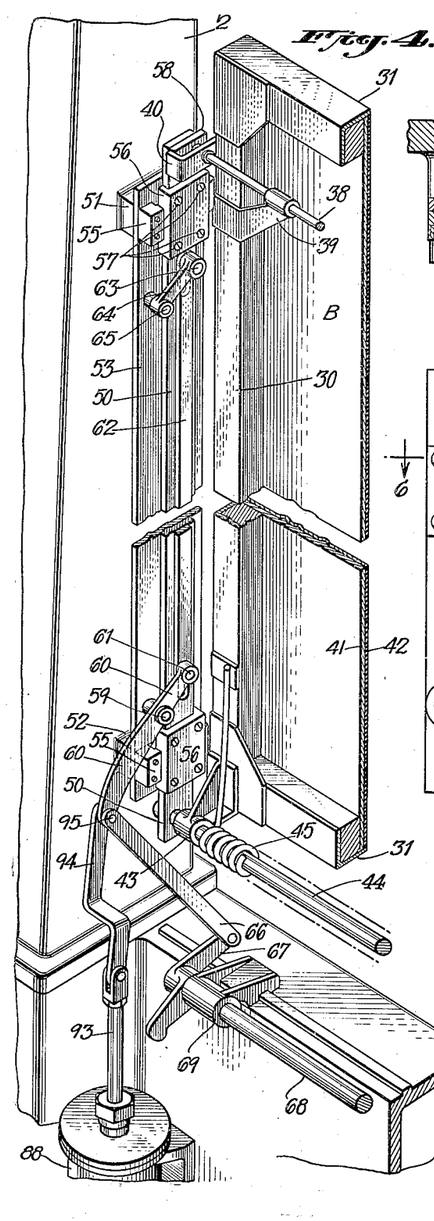
Fig. 4 is a perspective view further illustrative of the arrangement shown in Fig. 3.
Figure 5:
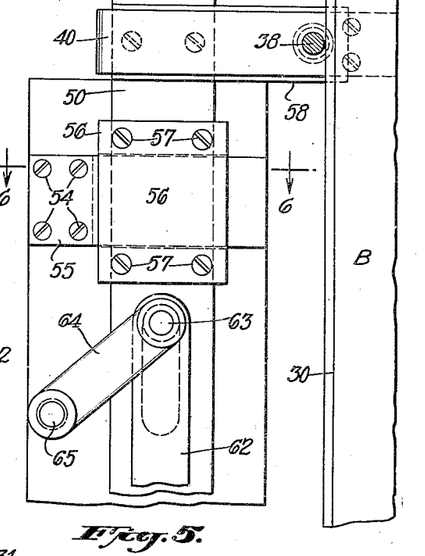
Fig. 5 is an elevational view, partly in section, showing a part of the mechanical arrangement for producing movement of the photo-composing machine backboard.

As indicated in Fig. 4, the rear surface of the backboard B, adjacent each upper corner thereof, has a bracket 40 suitably secured thereto. Each bracket 40 is formed with a transverse passage which is alined with the passage in the adjacent bracket 39. It follows, therefore, that each rod 38 is readily slidable in the passage through its associated bracket 39 and the passage in the adjacent bracket 40.

As shown in Figs. 3 and 4, the aforesaid frame of the backboard B has a supporting structure 41 secured thereto in suitable manner, this supporting structure being formed from fiber or other suitable material and supporting an outer surface 42 formed from hard rubber, or equivalent, to which the light-sensitive member S, Fig. 3, is secured in any suitable manner as known in the art.

As shown in Fig. 2, a plurality of brackets 43 are secured, in horizontal alinement, to the bottom frame member 31 of the backboard B. The pair of brackets at the left, Fig. 2, support a horizontally disposed axle member 44 whereas the pair of bracket members 43 at the right, Fig. 2, support a similar horizontally disposed axle member 44. Each of the axle members 44 supports a spiral spring 45, one end of which engages the rear surface of the backboard B and the other end of which is secured to one end of a member 47 secured at its other end to a link 48 pivoted to a bracket 49 upstanding from the base 1, Fig. 3.

As shown in Figs. 2 and 4, the outer respective ends of the axle members 44 are received in passages formed, respectively, in vertically disposed members 50 utilizable as hereinafter described.

As hereinafter pointed out, the backboard B, while in a vertical plane, is adapted to be moved either toward or from the supporting frame F. To this end, each of the hereinbefore described standards 2 carries an adjusting mechanism utilizable for supporting said backboard B so that it may be moved to and fro as just stated.

Figure 6:
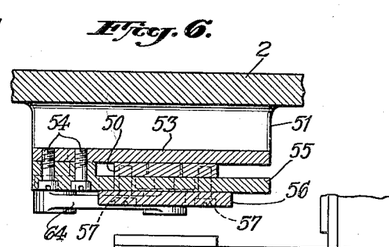
Fig. 6 is a horizontal sectional view, partly in plan, taken on the line 6—6 of Fig. 5 looking in the direction of the arrows.

Thus, the standard 2 shown at the left of Fig. 2 and in Fig. 4 has upper and lower blocks 51 and 52 extending horizontally therefrom, these blocks supporting a fixed vertical member 53. Suitably secured, as by the screws 54, to the fixed member 53 are the upper and lower key members 55 each being cut away as indicated in Fig. 6 and the cut away sections being disposed in vertical alinement so as to receive the aforesaid vertical member 50 which is adapted to be moved, while held vertical, toward or from the supporting frame F. Slidable horizontally on each key member 55 is a block 56, these blocks being secured to said member 50 by the screws 57. Above the upper block 51, the vertical member 50 has a member 58 suitably secured thereto, this member 58 comprising a horizontal passage adapted, when the backboard B is in vertical position to be in alinement with the path of movement of the aforesaid rod 38.

Pivoted at 59 to the fixed member 53, adjacent the lower end thereof, is a lever 60 having its outer end connected by a pivot pin 61 to a strap member 62, the inner end of said pivot pin 61 being operatively related to an elongated slot formed in the lower end of the aforesaid vertical member 50. The strap member 62 extends in a vertical direction and is disposed flatwise against the vertical member 50. At its upper end, said strap member 62 carries a pivot pin 63 on which a lever 64 is loosely supported, the latter being pivoted to the fixed member 53 by a pivot pin 65, and the pivot pin 63 being operatively related to an elongated slot formed in the upper end of the vertical member 50.

Connected to the lower end of the lever 60 is one end of a link 66, the other end of which is pivoted to a lever arm 67 secured to and rotatable with a horizontal shaft 68 mounted in bearings 69 carried by the aforesaid base 1, Figs. 2 and 4.

As stated above, each of the standards 2 supports an adjusting mechanism for shifting the backboard B in the manner described. Inasmuch as the adjusting mechanism for the standard 2 at the right, Fig. 2, is a duplicate of the one just described, this description will not be repeated and, on the drawings, duplicate reference characters will be used for designating corresponding parts.

The axle members 44 remain permanently in the respective passages formed therefor in the vertical members 50, respectively. When the backboard B is moved from horizontal position to vertical position as shown in Fig. 2, the axle members 50 form the pivotal support permitting this movement. As shown in Fig. 2, the handle 35 has been actuated to cause the rods 38 to be moved in opposite directions from each other whereby the end of each rod 38 has been caused to enter the passage provided therefor in the adjacent member 58. Accordingly, at this time, the backboard B is supported in a vertical plane solely by the vertical members 50.

When the backboard B is thus positioned, it will be understood that the shaft 68 may be rotated in one direction to thereby produce simultaneous movement of each link 66, each lever 60, each strap member 62 and each lever 64. By so doing, the vertical members 50 are moved jointly whereby the backboard B, while remaining in its vertical plane, is moved in one direction with respect to the printing plate 23. As will be obvious, rotation of the shaft 68 in reverse direction produces movement of the backboard B in the opposite direction with respect to said printing plate 23.

When the photo-composing machine hereinbefore described is to be operated, it will be understood by those skilled in the art that the hand wheel 13 is operated to move the frame sections 6 and 7 horizontally whereby the printing plate 23 is caused to assume its intended position in a vertical direction. In order to bring said printing plate 23 into its intended position in a horizontal direction, the hand wheel 22 is operated to thereby move the supporting frame F either upwardly or downwardly as desired. While these operations are being effected, the backboard B is so positioned that the light-sensitive surface S is not in contact with the printing plate 23. With the backboard B in its vertical plane, the described operations cause the printing plate 23 to be positioned opposite the area of the light-sensitive member S which is to receive the first printing impression. Thereupon, in the manner hereinafter described and in accordance with the invention, the backboard B is moved to its "in" position and, in so doing, the light-sensitive member S is brought into engagement with the endless sealing strip 24. The chamber around the printing plate 23 is partly sealed by the hereinbefore described sealing strips corresponding with the sealing strip 25 and by the frame 26. This chamber is completely sealed when the described engagement between the member S and strip 24 is effected and such chamber is hereinafter designated the "vacuum chamber." Thereafter, the printing operation may be proceeded with in the usual manner.

In accordance with the invention, rotatable movement in either direction of the aforesaid shaft 68 is effected in a novel manner, as hereinafter described, in order to move the backboard B either toward or from the printing plate 23.

Figures 7, 8:
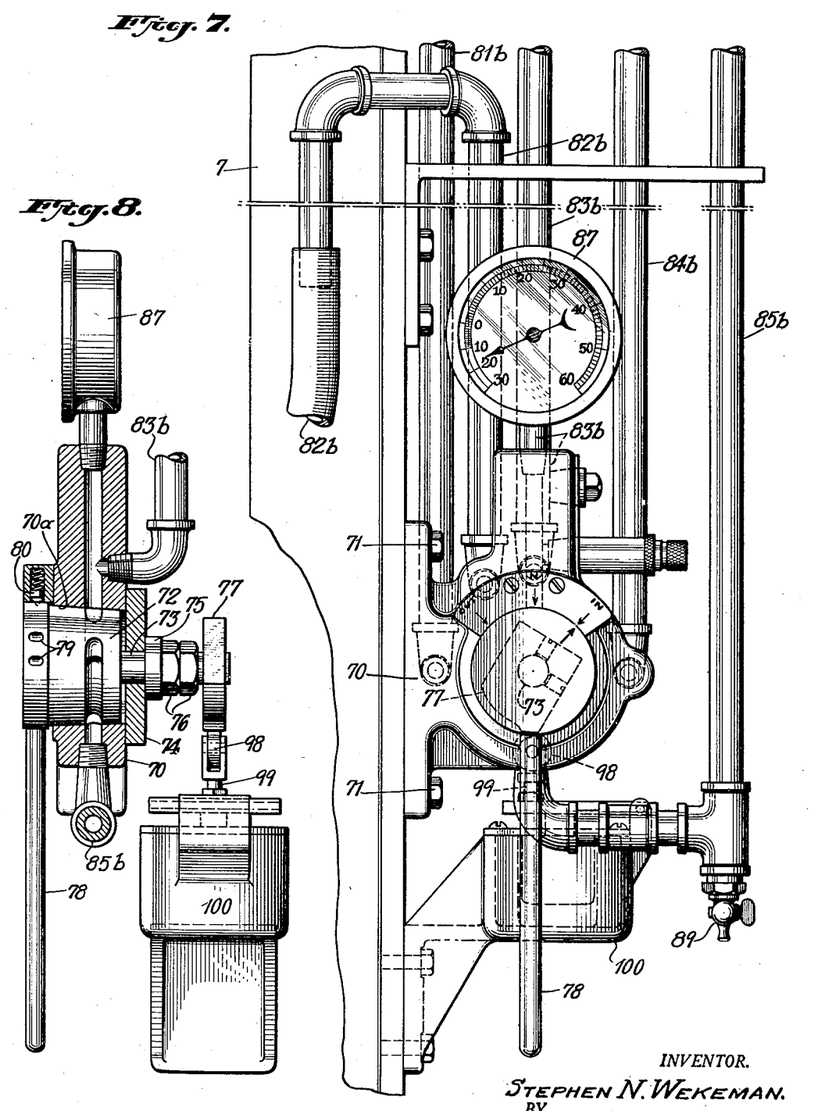
Fig. 7 is an elevational view showing the pneumatic control means of my invention.
Fig. 8 is a vertical sectional view, partly in elevation, showing a part of the control means of Fig. 7.

Thus, as shown in Figs. 1 and 7, the vertical member of the aforesaid frame section 7 at the right has a valve body or housing 70 secured thereto by screws 71. Mounted for rotatable movement in frusto-conical chamber 70a defined by the body 70 is the valve head 72 which comprises a centrally disposed shaft 73 journaled in a plate 74 secured to the body 70. As shown in Fig. 8, the head 72 is retained in its intended position by a bearing collar 75 and nut members 76. At its extreme end, the shaft 73 carries a cam disk 77 utilizable as hereinafter described. At its forward end, the head 72 carries an actuating handle 78 and, further, said head 72 comprises a plurality of peripheral depressions 79 individually engageable, during rotary movement of the head 72, with a spring-pressed detent 80 carried by the body 70.

Referring particularly to Figs. 8–13 inclusive, the body 70 is provided with a plurality of passages 81, 82, 83, 84, 85 which communicate with the body chamber 70a, the passages 81 and 84 being enlarged as indicated, respectively, at 81a and 84a.

Figures 9, 10, 11, 12, 13:
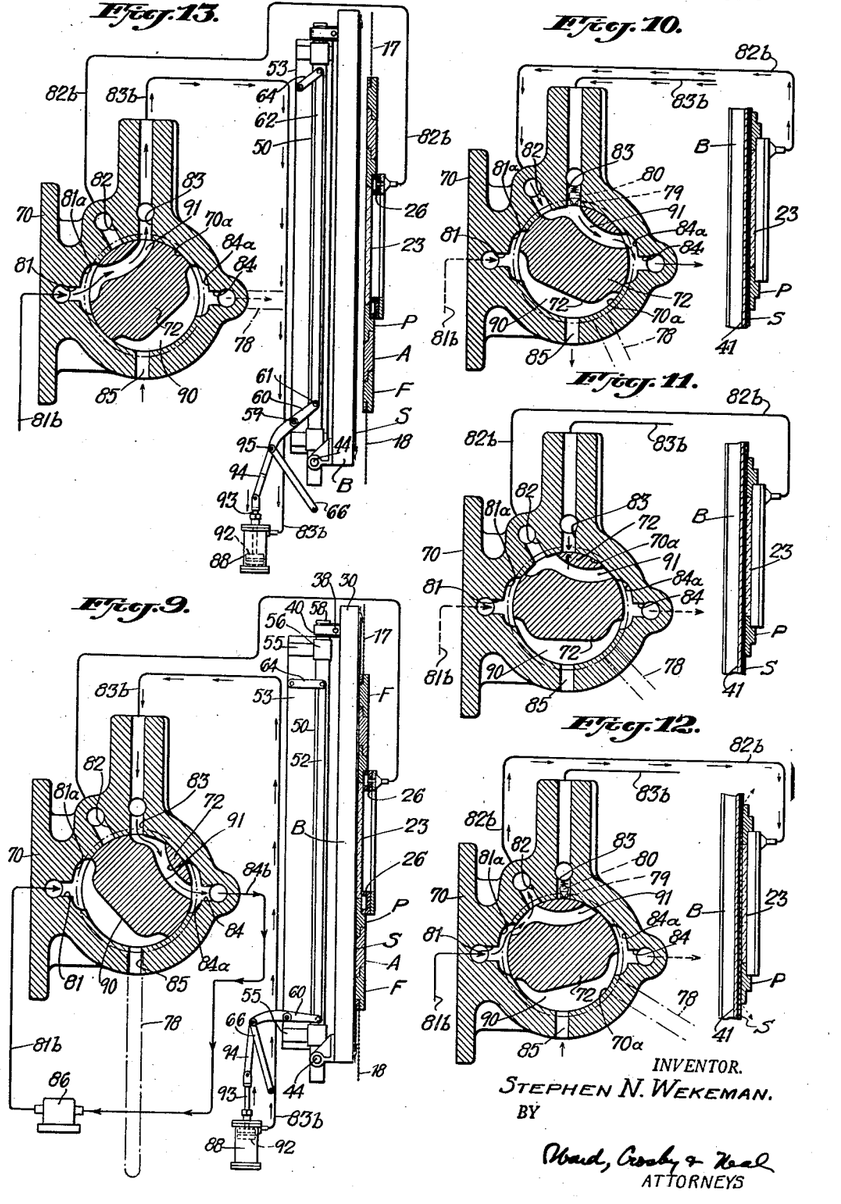
Figs. 9–13 inclusive are schematic views illustrating features of the invention.

As indicated in Fig. 7, the passage 81 has connected thereto a pipe 81b which leads to the discharge side of a suitable vacuum pump 86, Fig. 9. The passage 82 has connected thereto a conduit arrangement 82b which leads to the hereinbefore described vacuum chamber in which the printing plate 23 is disposed. Connected to the passage 83 are a pair of pipes 83b, 83b, one pipe 83b leading to a suitable gauge 87, Fig. 7, and the other pipe 83b leading to the upper side of a chamber formed in a housing 88, this chamber of the housing 88, except for said last named pipe 83b, being sealed from the atmosphere and utilizable as hereinafter described. The passage 84 has connected thereto a pipe 84b which leads to the intake side of the aforesaid vacuum pump 86, Fig. 9. Connected to the body passage 85 is a pipe 85b normally open to the atmosphere and carrying a valve 89 untilizable for draining any condensing moisture therefrom.

In accordance with the invention, the valve head 72 comprises a pair of passages 90, 91 formed peripherally therein as indicated in Figs. 8–13 inclusive. In the manner hereinafter described, the head passage 90 is adapted to cooperate with the body passages 81, 85 and 84 while the head passage 91 is adapted to cooperate with the body passages 81, 82, 83 and 84.

Disposed within and movable vertically in the aforesaid housing 88 is a piston 92 having a rod 93 connected thereto. Connected pivotally to one end of the rod 93 is one end of a link 94, the other end of which is pivoted at 95 to the junction of the hereinbefore described lever 60 and link 66.

In accordance with the invention, the aforesaid piston 92 is utilizd for moving the backboard from its "in" position to its "out" position and vice versa. Thus, as shown in Fig. 3, the piston 92 is in its upper position and the backboard B is in its "in" position. In response to movement of the piston 92 to its lower position, motion is transmitted to the shaft 68 through the mechanical arrangement comprising the rod 93, the links 94 and 66, and the lever 67 whereby said shaft 68 is rotated from the full line position thereof shown in Fig. 3 to the broken line position. As hereinbefore described, such movement of the shaft 68 is transmitted to the vertical members 50 to thereby produce movement of the backboard B to its "out" position while remaining in its described vertical plane. Obviously, when the piston 92 is moved from its lowermost position to its uppermost position, the shaft 68, by the described mechanical arrangement, is moved reversely from the broken line position thereof shown in Fig. 3 to the full line position. In so doing, reverse movement is imparted to the backboard B to move it to its "in" position.

With the form of the invention herein disclosed, the handle 78 is adapted to be moved ninety degrees in a clockwise direction from the position thereof shown in Figs. 7 and 9. This handle 78 is adapted to occupy five different positions which are spaced apart by angles of eighteen degrees approximately. As will be understood, the hereinbefore described peripheral depressions 79 on the valve head 72 are spaced in correspondence with the foregoing and each depression 79 cooperates with the detent 80 to determine a position of the valve head 72 and the handle 78.

The vacuum pump 86, hereinbefore described, is operated continuously whenever the photocomposing machine is utilized for its intended purpose.

In Fig. 9, the handle 78 is in its vertical position and the valve head 72 is positioned in such manner that the body passage 81 is in communication with the body passage 85 by way of the head passage 90. Therefore, the discharge side of the vacuum pump 86 exhausts to the atmosphere. The body passage 82 is closed by the head 72 and, accordingly, the vacuum pump 86 has no effect on the vacuum chamber. The body passage 83 is connected to the body passage 84 by way of the head passage 91 and, as a result, the chamber defined by the housing 88 is connected to the intake side of the vacuum pump 86 whereby the piston 92 is held in its upward position by the vacuum effect. As hereinbefore stated, when said piston 92 is in its upward position, the backboard B is in its "in" position.

When the handle 78 is in the position thereof shown in Fig. 9, the high surface of the cam 77, Figs. 7 and 8, engages and depresses a roller 98 carried by a movable contact-carrying member 99 of an electrical switch 100. When the contact-carrying member 99 is thus depressed, the circuit through a signal lamp, not shown, is closed. When the handle 78 is in each of the positions shown in Figs. 9, 10, 11 and 12, the cam 77 holds the member 99 in circuit-closing position. However, when the handle 78 is in the position thereof shown in Fig. 13, the cam 77 is so positioned that the circuit through the aforesaid signal lamp is open.

In Fig. 10, the handle 78 is in that position wherein it has been moved one step from the vertical position thereof shown in Fig. 9. Under this condition, the valve head 72 is positioned in such manner that the body passage 81 is in communication with the body passage 85 by way of the head passage 90. Therefore, the discharge side of the vacuum pump 86 continues to exhaust to the atmosphere. The body passages 82 and 83 are connected to the body passage 84 by way of the head passage 91 and, as a result, the aforesaid vacuum chamber for the printing plate 23 is connected to the intake side of the vacuum pump, the chamber defined by the housing 88 remaining connected to said intake side of the vacuum pump 86. Accordingly, at this time, the printing plate 23 and the light-sensitive surface S are held in close, intimate relation.

When the cam 77 moved the member 99 to circuit-closing position as described above, a circuit was prepared for closing the circuit of the printing lamp, not shown, which directs a beam of light through the printing plate 23 and onto the light-sensitive surface S in order to effect the printing operation. When the handle 78 is in the position thereof shown in Fig. 10, the operator closes another switch, not shown, to complete said circuit and energize said printing lamp. The printing lamp is thus energized only when the handle 78 is in the position thereof shown in Fig. 10.

In Fig. 11, the handle 78 is in that position wherein it has been moved two steps from the vertical position thereof shown in Fig. 9 and the valve head 72 is positioned in such manner that the body passages 81 and 84 are in communication with the body passage 85 by way of the head passage 90. Therefore, both the intake side and the discharge side of the vacuum pump 86 are in communication with the atmosphere. Further, in Fig. 11, the position of the valve head 72 is such that neither the intake side nor the discharge side of the vacuum pump 86 are in communication with the body passages 82 and 83. In Fig. 11, then, the handle 78 and the valve head 72 may be said to be positioned in "neutral." There is neither suction nor pressure for the aforesaid vacuum chamber for the printing plate 23 and the chamber defined by the housing 88.

In Fig. 12, the handle 78 is in that position wherein it has been moved three steps from the vertical position thereof shown in Fig. 9 and the valve head 72 is positioned in such manner that the body passage 81 is in communication with the body passage 82 by way of the head passage 91. Therefore, the discharge side of the vacuum pump 86 is connected to the aforesaid vacuum chamber for the printing plate 23 to thereby produce therein a pressure effect which overcomes the previous vacuum effect. It will be noted that the contour of the head passage 91 is such that, when the head 72 is positioned as shown in Fig. 12, the body passage 83 is closed. Therefore, at this time, pressure is not applied to the piston housing 88. For the relation shown in Fig. 12, the body passage 84 remains in communication with the atmosphere by way of the head passage 90.

In Fig. 13, the handle 78 is in that position wherein it has been moved four steps from the vertical position thereof shown in Fig. 9 and the valve head 72 is positioned in such manner that the body passage 81 is in communication with the body passage 83 by way of the head passage 91. Therefore, the discharge side of the vacuum pump 86 is connected to the chamber defined by the housing 88 with the result that the piston 92 is moved to its lower position and the backboard B is moved to its "out" position. It will be noted that the contour of the head passage 91 is such that, when the head 72 is positioned as shown in Fig. 13, the body passage 82 is closed. Therefore, pressure is no longer applied to the vacuum chamber for the printing plate 23. For the relation shown in Fig. 13, the body passage 84 remains in communication with the atmosphere by way of the head passage 90.

While the handle 78 remains positioned as shown in Fig. 13, application of pressure to the housing 88 continues with the result that the backboard B is positively held in its "out" position. At this time, the operator, in the manner hereinbefore described, rotates the hand wheels 13 and 22 in order to obtain the next succeeding position for the printing plate 23. When this position has been properly determined, the operator, by a snapping action, returns the handle 78 from the position thereof shown in Fig. 13 to the position shown in Fig. 9. By so doing, the connection to the housing 88 is reversed in the sense that the pressure side of the vacuum pump 86 is disconnected from said housing and the vacuum side of said vacuum pump 86 is connected thereto. Accordingly, by action of suction, the backboard B is returned to its "in" position. Thereafter, the operator continues with the cycle of operations in the manner hereinbefore described.

The references in this specification and in the appended claims to "pneumatic means" or the like shall be understood as generically including means for producing a suction effect and means for producing an air pressure effect.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a photo-composing machine, means for supporting a printing plate, a backboard for supporting a light-sensitive surface in a plane parallel with and spaced from the plane of said printing plate, means for effecting relative movement between said supporting means and said backboard to position said printing plate opposite different areas of said backboard, and mechanism effective in different relative positions of said printing plate and said backboard for moving said backboard toward said printing plate to cause engagement thereof with said light-sensitive surface, said mechanism comprising means for pneumatically applying force to said backboard.

2. In a photo-composing machine, means for supporting a printing plate, a backboard for supporting a light-sensitive surface in a plane parallel with and spaced from the plane of said printing plate, means for effecting relative movement between said supporting means and said backboard to position said printing plate opposite different areas of said backboard, and mechanism effective in different relative positions of said printing plate and said backboard for moving said backboard toward said printing plate to cause engagement thereof with said light-sensitive surface, said mechanism comprising means for applying force to said backboard in response to creation of a suction effect.

3. In a photo-composing machine, a support for a printing plate, a backboard for supporting a light-sensitive surface in a plane parallel with the plane of said printing plate, means supporting said backboard for movement toward or from said printing plate while maintaining the parallel-plane relation with respect thereto, means for effecting relative movement between said support and said supporting means to position said printing plate opposite different areas of said backboard, means effective in different relative positions of said printing plate and said backboard for operating said supporting means to move said backboard toward or from said printing plate, and pneumatic means for actuating said operating means.

4. In a photo-composing machine, a support for a printing plate, a backboard for supporting a light-sensitive surface in a plane parallel with the plane of said printing plate, means supporting said backboard for movement toward or from said printing plate while maintaining the parallel-plane relation with respect thereto, means for effecting relative movement between said support and said supporting means to position said printing plate opposite different areas of said backboard, a rotatable shaft effective in different relative positions of said printing plate and said backboard for operating said supporting means to move said backboard toward or from said printing plate, and means for pneumatically actuating said rotatable shaft.

5. In a photo-composing machine, a support for a printing plate, a backboard for supporting a light-sensitive surface in a plane parallel with the plane of said printing plate, means supporting said backboard for movement toward or from said printing plate while maintaining the parallel-plane relation with respect thereto, means for effecting relative movement between said support and said supporting means to position said printing plate opposite different areas of said backboard, a rotatable shaft effective in different relative positions of said printing plate and said backboard for operating said supporting means to move said backboard toward or from said printing plate, a housing having a piston therein, means for connecting said piston to said shaft, and means for pneumatically moving said piston in opposite directions.

6. In a photo-composing machine, a support for a printing plate, a backboard for supporting a light-sensitive surface in a plane parallel with the plane of said printing plate, means supporting said backboard for movement toward or from said printing plate while maintaining the parallel-plane relation with respect thereto, means for effecting relative movement between said support and said supporting means to position said printing plate opposite different areas of said backboard, a rotatable shaft effective in different relative positions of said printing plate and said backboard for operating said supporting means to move said backboard toward or from said printing plate, a housing having a piston therein, means for connecting said piston to said shaft, means for increasing the air pressure in said housing to move said piston in one direction, and means for decreasing the air pressure in said housing to move said piston in reverse direction.

7. In a photo-composing machine, a support for a printing plate, a backboard for supporting a light-sensitive surface in a plane parallel with the plane of said printing plate, means supporting said backboard for movement toward or from said printing plate while maintaining the parallel-plane relation with respect thereto, means for effecting relative movement between said support and said supporting means to position said printing plate opposite different areas of said backboard, a rotatable shaft effective in different relative positions of said printing plate and said backboard for operating said supporting means to move said backboard toward or from said printing plate, a housing having a piston therein, means for connecting said piston to said shaft, means for increasing the air pressure in said housing to move said piston in one direction, means for decreasing the air pressure in said housing to move said piston in reverse direction, said last two means comprising a vacuum pump having discharge and intake sides, and a valve for connecting the discharge and intake sides of said vacuum pump alternately to said housing.

8. In a photo-composing machine, a support for a printing plate, a support for a light-sensitive surface, said supports being positioned with respect to each other in such manner that said printing plate and said light-sensitive surface are disposed in printing relation, a housing, a piston movable therein for moving said second named support from said first named support, means forming a vacuum chamber in which said printing plate is disposed, vacuum-producing means, and a valve adapted to occupy one position wherein said vacuum-producing means is connected to said housing to hold said piston in one position therein, said valve being adapted to occupy another position wherein said vacuum-producing means is connected to said vacuum chamber, said valve, while in said last named position, connecting said vacuum-producing means to said housing.

9. In a photo-composing machine, a support for a printing plate, a support for a light-sensitive surface, said supports being positioned with respect to each other in such manner that said printing plate and said light-sensitive surface are disposed in printing relation, a housing, a piston movable therein for moving said second named support from said first named support, means forming a vacuum chamber in which said printing plate is disposed, vacuum-producing means, and a valve adapted to occupy one position wherein said vacuum-producing means is connected to said housing to hold said piston in one position therein, said valve being adapted to occupy another position wherein said vacuum-producing means is connected to said vacuum chamber, said valve, while in said last named position, connecting said vacuum-producing means to said housing, said valve being adapted to occupy another position wherein said vacuum-producing means is disconnected from said vacuum chamber and said housing.

10. In a photo-composing machine, a support for a printing plate, a support for a light-sensitive surface, said supports being positioned with respect to each other in such manner that said printing plate and said light-sensitive surface are disposed in printing relation, a housing, a piston movable therein for moving said second named support from said first named support, means forming a vacuum chamber in which said printing plate is disposed, a vacuum pump having discharge and intake sides, and a valve adapted to occupy one position wherein the intake side of said vacuum pump is connected to said housing to hold said piston in one position therein, said valve being adapted to occupy another position wherein the intake side of said vacuum pump is connected to said vacuum chamber, said valve, while in said last named position, connecting the intake side of said vacuum pump to said housing, said valve being adapted to occupy another position wherein said vacuum pump is disconnected from said vacuum chamber and said housing, said valve being adapted to occupy another position wherein the discharge side of said vacuum pump is connected to said vacuum chamber.

11. In a photo-composing machine, a support for a printing plate, a support for a light-sensitive surface, said supports being positioned with respect to each other in such manner that said printing plate and said light-sensitive surface are disposed in printing relation, a housing, a piston movable therein for moving said second named support from said first named support, means forming a vacuum chamber in which said printing plate is disposed, a vacuum pump having discharge and intake sides, and a valve adapted to occupy one position wherein the intake side of said vacuum pump is connected to said housing to hold said piston in one position therein, said valve being adapted to occupy another position wherein the intake side of said vacuum pump is connected to said vacuum chamber, said valve, while in said last named position, connecting the intake side of said vacuum pump to said housing, said valve being adapted to occupy another position wherein said vacuum pump is disconnected from said vacuum chamber and said housing, said valve being adapted to occupy another position wherein the discharge side of said vacuum pump is connected to said vacuum chamber, said valve being adapted to occupy another position wherein the discharge side of said vacuum pump is connected to said housing to hold said piston in another position therein.

12. In a photo-composing machine, a support for a printing plate, a backboard for supporting a light-sensitive surface in a plane parallel with the plane of said printing plate, means supporting said backboard for movement toward or from said printing plate, means for effecting relative movement between said support and said supporting means to position said printing plate opposite different areas of said backboard, means effective in different relative positions of said printing plate and said backboard for operating said first named means, means forming a vacuum chamber in which said printing plate is disposed while in printing position, and pneumatic means for exhausting the air from said vacuum chamber and for actuating said operating means as successive operations.

STEPHEN N. WEKEMAN.